US012159598B2

(12) United States Patent
Chen et al.

(10) Patent No.: US 12,159,598 B2
(45) Date of Patent: Dec. 3, 2024

(54) E-PAPER DISPLAY APPARATUS AND DRIVING METHOD OF E-PAPER DISPLAY PANEL

(71) Applicant: E Ink Holdings Inc., Hsinchu (TW)

(72) Inventors: Jia-Hung Chen, Hsinchu (TW); An-Chi Liu, Hsinchu (TW); Yu-Mao Lin, Hsinchu (TW); Kuang Cheng Fu, Hsinchu (TW); Pei Ju Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/498,052

(22) Filed: Oct. 31, 2023

(65) Prior Publication Data

US 2024/0221692 A1 Jul. 4, 2024

(30) Foreign Application Priority Data

Dec. 30, 2022 (TW) .................................. 111150877

(51) Int. Cl.
*G09G 3/34* (2006.01)

(52) U.S. Cl.
CPC ..... *G09G 3/344* (2013.01); *G09G 2310/0267* (2013.01); *G09G 2310/08* (2013.01); *G09G 2380/14* (2013.01)

(58) Field of Classification Search
None
See application file for complete search history.

(56) References Cited

U.S. PATENT DOCUMENTS

| | | | | |
|---|---|---|---|---|
| 8,054,267 | B2 | 11/2011 | Chen | |
| 10,802,351 | B2 | 10/2020 | Hao et al. | |
| 10,914,997 | B2 | 2/2021 | Long et al. | |
| 10,957,717 | B2 | 3/2021 | Chan et al. | |
| 2012/0206659 | A1 | 8/2012 | Tsubata | |
| 2014/0139409 | A1 | 5/2014 | Sato et al. | |
| 2017/0011695 | A1* | 1/2017 | Nakata | G09G 3/3677 |
| 2017/0242533 | A1 | 8/2017 | Liu et al. | |
| 2019/0237034 | A1 | 8/2019 | Hao | |
| 2020/0111812 | A1* | 4/2020 | Chan | H01L 27/124 |

FOREIGN PATENT DOCUMENTS

| | | |
|---|---|---|
| CN | 106200192 | 12/2016 |
| CN | 113869095 | 12/2021 |
| TW | 201822183 | 6/2018 |

OTHER PUBLICATIONS

"Office Action of Taiwan Counterpart Application", issued on Dec. 5, 2023, p. 1-p. 4.

* cited by examiner

*Primary Examiner* — Matthew Yeung
(74) *Attorney, Agent, or Firm* — JCIPRNET

(57) ABSTRACT

An e-paper display apparatus includes an e-paper display panel including multiple source lines, multiple gate selection lines, and multiple pixel circuits and a driver circuit coupled to the e-paper display panel and configured to output a driving signal to the gate selection line. The gate selection lines and the source lines are disposed along a first direction. The source lines corresponding to the gate selection line simultaneously receive respective data signals when the gate selection line is turned on. The driving signal includes a first period and a second period. The gate selection line is turned on during the first period, and the gate selection line is turned off during the second period. A time length of the first period is greater than a time length of the second period.

7 Claims, 2 Drawing Sheets

E-PAPER DISPLAY APPARATUS AND DRIVING METHOD OF E-PAPER DISPLAY PANEL

CROSS-REFERENCE TO RELATED APPLICATION

This application claims the priority benefit of Taiwan application serial no. 111150877, filed on Dec. 30, 2022. The entirety of the above-mentioned patent application is hereby incorporated by reference herein and made a part of this specification.

BACKGROUND

Technical Field

The disclosure relates to a display apparatus and a driving method of a display panel, and in particular, to an e-paper display apparatus and a driving method of an e-paper display panel.

Description of Related Art

Generally, the way to drive an e-paper display panel to display an image screen is to turn on a gate line, and write a data signal in sequence into a pixel circuit so as to drive the pixel circuit to display the respective image data. The gate line is configured to control the turn-on state of the transistor elements of the same pixel row, and a driver circuit controls each pixel row to turn on in sequence so as to drive the e-paper display panel to display the image screen.

In the conventional technology, in addition to the gate line, the e-paper display panel may further include a gate selection line due to different pixel design methods. However, in the structure in which a gate line is configured with a gate selection line, the stray capacitance of the e-paper display panel circuit increases, thereby increasing the driving load of the driver circuit, and the driving voltage for driving the gate line also needs to be increase to maintain the charge rate.

SUMMARY

The disclosure provides an e-paper display apparatus and a driving method of an e-paper display panel, which may reduce the driving voltage and the stray capacitance of the circuit, thereby reducing the power consumption.

An e-paper display apparatus of the disclosure includes an e-paper display panel including multiple source lines, multiple gate selection lines, and multiple pixel circuits and a driver circuit coupled to the e-paper display panel and configured to output a driving signal to the gate selection line. The gate selection lines and the source lines are disposed along a first direction. The source lines corresponding to the gate selection line simultaneously receive respective data signals when the gate selection line is turned on. The driving signal includes a first period and a second period. The gate selection line is turned on during the first period, and the gate selection line is turned off during the second period. A time length of the first period is greater than a time length of the second period.

In an embodiment of the disclosure, the time length of the above-mentioned first period is T1, and T1 conforms to $(1/f/GL)<T1<(1/f/GL)\times 2$, where f is the frame rate of the e-paper display panel, and GL is the number of pixel circuits arranged in the first direction.

In an embodiment of the disclosure, the time length T1 of the above-mentioned first period conforms to $(1/f/GL)\times 1.5<T1<(1/f/GL)\times 2$.

In an embodiment of the disclosure, the above-mentioned e-paper display panel further includes multiple gate lines. The pixel circuits are electrically connected to the respective gate line and the respective source line, and the gate selection lines are electrically connected to the corresponding gate line.

In an embodiment of the disclosure, each of the above-mentioned pixel circuits includes a transistor element, and the transistor element is an oxide thin-film transistor.

In an embodiment of the disclosure, the number of the gate selection lines is less than the number of the source lines.

In an embodiment of the disclosure, each gate selection line is disposed between the corresponding two adjacent source lines among the source lines.

A driving method of an e-paper display panel of the disclosure is provided hereafter. A driving signal is output to multiple gate selection lines of the e-paper display panel. The gate selection lines and source lines are disposed along a first direction. The respective data signals are simultaneously output to the source lines corresponding to the gate selection line when the gate selection line is turned on.

In an embodiment of the disclosure, the above-mentioned driving signal includes a first period and a second period. The steps of outputting the driving signal to the gate selection line of the e-paper display panel are provided hereafter. The gate selection line is turned on during the first period. The gate selection line is turned off during the second period.

In order to make the above-mentioned features and advantages of the disclosure clearer and easier to understand, the following specific embodiments are described in detail together with the accompanying drawings.

DESCRIPTION OF THE EMBODIMENTS

Figure 1:
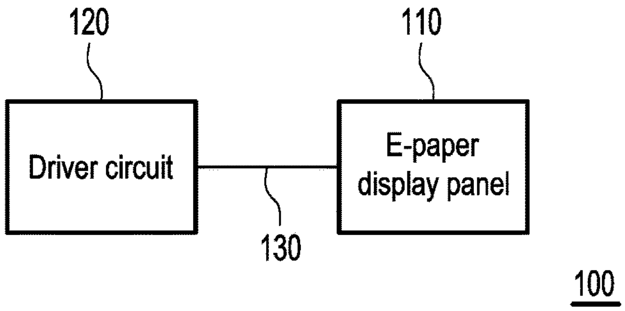
FIG. 1 is a schematic block diagram of an e-paper display apparatus according to an embodiment of the disclosure.
Figure 2:
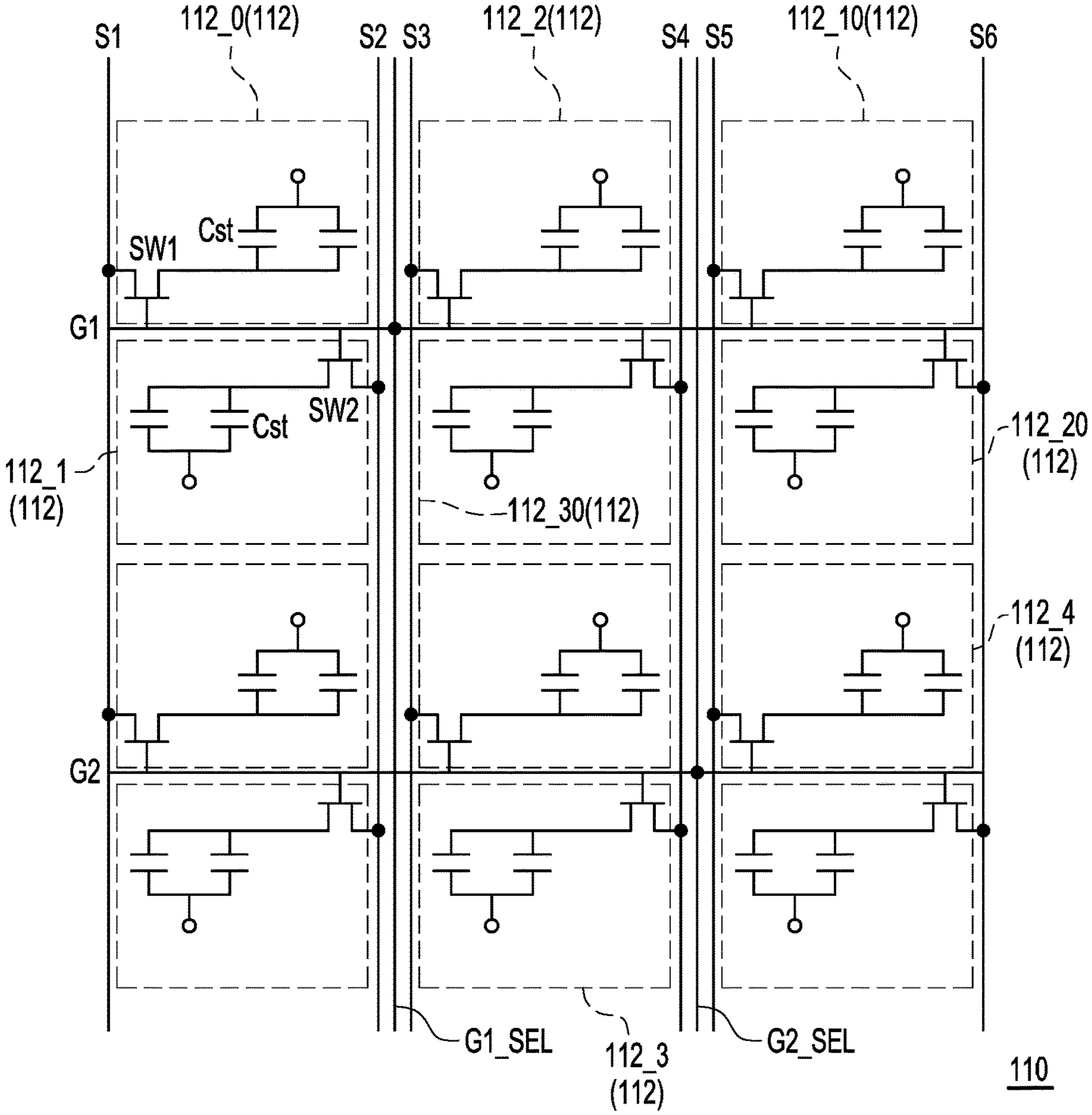
FIG. 2 is a schematic structural diagram of the e-paper display panel of the embodiment shown in FIG. 1.

FIG. 1 is a schematic block diagram of an e-paper display apparatus according to an embodiment of the disclosure. FIG. 2 is a schematic structural diagram of the e-paper display panel of the embodiment shown in FIG. 1. Referring to FIG. 1 and FIG. 2, an e-paper display apparatus 100 of the embodiment includes an e-paper display panel 110 and a driver circuit 120 coupled to the e-paper display panel 110 and configured to output a driving signal 130 so as to drive the e-paper display panel 110 to display the image screen.

The e-paper display panel 110 includes multiple gate lines G1 and G2, multiple source lines S1, S2, S3, S4, S5, and S6, multiple gate selection lines G1_SEL and G2_SEL, and multiple pixel circuits 112. The source lines S1, S2, S3, S4, S5, and S6 and the gate selection lines G1_SEL and G2_SEL are disposed along a first direction (vertical direction), and arranged along a second direction (horizontal direction). The pixel circuits 112 are electrically connected to the respective gate line and the respective source line. The gate selection lines are electrically connected to the corresponding gate line. Each gate selection line is disposed between the corresponding two adjacent source lines among the multiple source lines. In the embodiment, the number of gate selection lines is less than the number of source lines. The number of gate selection lines is equal to the number of gate lines.

For example, the pixel circuit 112_0 is electrically connected to the gate line G1 and the source line S1. The gate selection line G1_SEL is electrically connected to the gate line G1. The gate selection line G1_SEL is disposed between the corresponding two adjacent source lines S2 and S3 among the source lines S1, S2, S3, S4, S5, and S6, and no pixel circuit is disposed between the corresponding two adjacent source lines S2 and S3. The gate selection line G2_SEL is electrically connected to the gate line G2. The gate selection line G2_SEL is disposed between the corresponding two adjacent source lines S4 and S5 among the source lines S1, S2, S3, S4, S5, and S6. In addition, in the embodiment, the gate selection line G1_SEL is electrically insulated from the gate line G2, and the gate selection line G2_SEL is electrically insulated from the gate line G1.

In addition, the multiple source lines among the source lines S1, S2, S3, S4, S5, and S6 are included between the two adjacent gate selection lines G1_SEL and G2_SEL among the gate selection lines. For example, the source lines S3 and S4 are included between the two adjacent gate selection lines G1_SEL and G2_SEL.

In the embodiment, since the two adjacent source lines are provided with a gate selection line, the number of gate selection lines is less than the number of source lines. Therefore, compared with the structure in the conventional technology in which a gate line is configured with a gate selection line, the stray capacitance of the e-paper display panel circuit may be reduced, such that the power consumption and the border range around the e-paper display panel 110 may be further reduced. In addition, the number of elements and the number of signal lines in FIG. 2 are only used for illustration, and are not intended to limit the disclosure.

On the other hand, each pixel circuit 112 includes a storage capacitor Cst and a transistor element SW1 or SW2, and the transistor element SW1 or SW2 may be used as a switch element. The transistor element SW1 or SW2 is implemented as an oxide thin-film transistor, for example, and the structure thereof includes a channel layer. The material of the channel layer is oxide, such as indium gallium zinc oxide (IGZO) or indium zinc tin oxide (IZTO). The material of the above-mentioned channel layer is used for illustration only, and is not intended to limit the disclosure.

Figure 3:
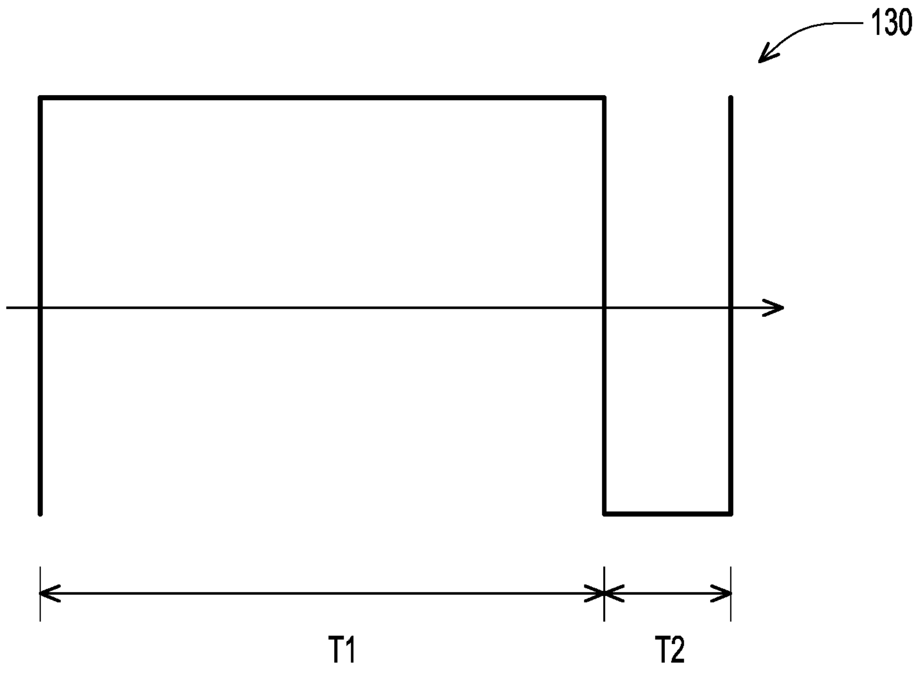
FIG. 3 is a schematic waveform diagram of a driving signal according to an embodiment of the disclosure.

The driver circuit 120 is configured to output the driving signal 130 to the gate selection lines G1_SEL and G2_SEL so as to drive the e-paper display panel 110 to display the image screen. FIG. 3 is a schematic waveform diagram of a driving signal according to an embodiment of the disclosure. Referring to FIG. 1 to FIG. 3, the driving signal 130 of the embodiment includes a first period T1 and a second period T2. The time length of the first period T is greater than the time length of the second period T2. Regarding the structure and implementation of the driver circuit 120 of the embodiment, sufficient teachings, suggestions, and implementation descriptions may be obtained from common knowledge in the technical field.

The driving signal 130 shown in FIG. 3 is, for example, the driving signal 130 output to the gate selection line G1_SEL. During the first period T1, the driving signal 130 is in a high level (first level) state, so that the gate selection line G1_SEL is turned on. During the second period T2, the driving signal 130 is in a low level (second level) state, so that the gate selection line is not turned on. In the embodiment, turning on the gate selection line means that the transistor element electrically connected to the gate selection line through the gate line is turned on. For example, turning on the gate selection line G1_SEL means that the transistor elements SW1 to SW2 electrically connected to the gate selection line G1_SEL through the gate line G1 are turned on, so that the data signals input from the source lines S1 to S6 may be respectively written into the pixel circuits 112_0, 112_1, 112_2, 112_10, 112_20, and 112_30.

Specifically, in the embodiment, when the gate selection line G1_SEL is turned on, the source lines S1 to S6 corresponding to the gate selection line G1_SEL simultaneously receive the respective data signals. Taking the adjacent source lines S2 and S3 as an example, the gate selection line G1_SEL is disposed between the two adjacent source lines S2 and S3. The data signals are respectively written into the pixel circuits 112_1 (first pixel circuit) and 112_2 (second pixel circuits) among the pixel circuits 112 from the two adjacent source lines S2 and S3, and the pixel circuits 112_1 and 112_2 are not adjacent. The pixel circuits 112_1 and 112_2 are located in different pixel columns and pixel rows.

Next, when the gate selection line G2_SEL is turned on, the source lines S1 to S6 corresponding to the gate selection line G2_SEL simultaneously receive the respective data signals. Taking the adjacent source lines S4 and S5 as an example, the gate selection line G2_SEL is disposed between the two adjacent source lines S4 and S5. The data signals are respectively written into the pixel circuits 112_3 and 112_4 from the two adjacent source lines S4 and S5, and the pixel circuits 112_3 and 112_4 are not adjacent. The pixel circuits 112_3 and 112_4 are located in different pixel columns and pixel rows.

In the embodiment, the gate selection line between two adjacent source lines is configured to control the pixel circuits in different columns, so that compared with the structure in the conventional technology in which a gate line is configured with a gate selection line, the turn-on time T1 may be extended, such that the charging time of the pixel circuit may be prolonged and the driving voltage (i.e., the gate voltage) for driving the gate selection line and the gate line may be reduced.

In detail, in FIG. 3, the time length of the first period is T1, and T1 conforms to $(1/f/GL)<T1<(1/f/GL)\times 2$, where f is the frame rate of the e-paper display panel 110, and GL is the number of pixel circuits 112 arranged in the first direction. For example, the frame rate of the e-paper display panel 110 is 85 hertz (Hz), and the resolution is 2480×1860. The resolution is defined as 2480 pixel circuits 112 controlled by the transistor element SW1 or SW2 in the vertical direction (first direction), and 1860 pixel circuits 112 controlled by the transistor element SW1 or SW2 in the horizontal direction (second direction). Referring to FIG. 3 for illustration, the e-paper display panel 110 has four transistor elements in the vertical direction (first direction) shown in FIG. 3, and has three transistor elements in the horizontal direction (second direction).

Therefore, the time length T1 of the first period is $(1/f/GL)\times 2$ minus the RC delay time, so the time length T1 of the first period is less than $(1/f/GL)\times 2$, but greater than the turn-on time (1/f/GL) of the conventional technology. In another embodiment, the time length T1 of the first period conforms to $(1/f/GL)\times 1.5<T1<(1/f/GL)\times 2$.

Figure 4:
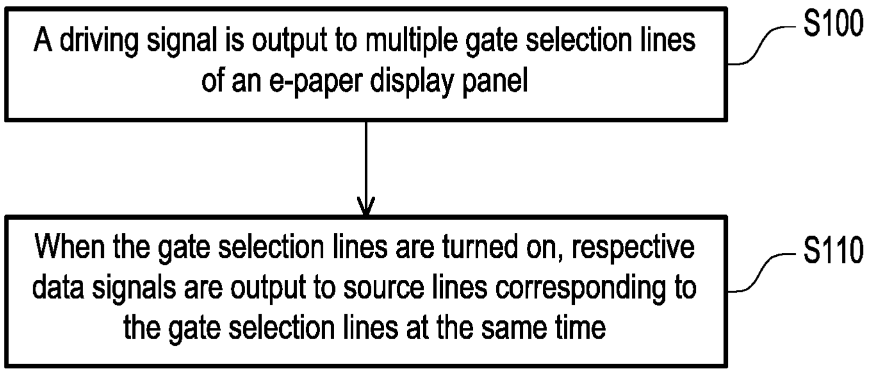
FIG. 4 is a process flow diagram of a driving method of an e-paper display panel according to an embodiment of the disclosure.

FIG. 4 is a process flow diagram of a driving method of an e-paper display panel according to an embodiment of the disclosure. Referring to FIG. 1 to FIG. 4, the driving method of the e-paper display panel of the embodiment is at least applicable to the e-paper display panel 110 of FIG. 2, but the disclosure is not limited thereto. Taking the e-paper display panel 110 of FIG. 2 as an example, in step S100, the driver circuit 120 outputs a driving signal 130 to the multiple gate selection lines G1_SEL and G2_SEL of the e-paper display panel 110. In step S110, taking the gate selection line G1_SEL as an example, when the gate selection line G1_SEL is turned on, the driver circuit 120 simultaneously outputs the respective data signals to the source lines S1 and S2 corresponding to the gate selection line G1_SEL. In addition, regarding the driving method of the e-paper display panel of the embodiment of the disclosure, sufficient teachings, suggestions, and implementation descriptions may be obtained from the description of the embodiments of FIG. 1 to FIG. 3.

To sum up, in the embodiment of the disclosure, since the two directly adjacent source lines are provided with only a gate selection line, the number of gate selection lines is less than the number of source lines. Therefore, compared with the structure in the conventional technology in which a gate line is correspondingly configured with a gate selection line, the stray capacitance of the e-paper display panel circuit may be reduced, such that the power consumption and the border range around the e-paper display panel may be further reduced. In addition, using the gate selection line located between the two adjacent source lines to control the pixel circuits in different columns may extend the turn-on time of the gate selection line, prolong the charging time of the pixel circuit, and reduce the driving voltage for driving the gate selection line and the gate line.

Although the disclosure has been described with reference to the embodiments above, the embodiments are not intended to limit the disclosure. Any person skilled in the art can may make some changes and modifications without departing from the spirit and scope of the disclosure. Therefore, the scope of the disclosure will be defined in the appended claims.

What is claimed is:

1. An e-paper display apparatus, comprising:

an e-paper display panel, comprising a plurality of source lines, a plurality of gate selection lines, and a plurality of pixel circuits, wherein the gate selection lines and the source lines are disposed along a first direction; and a driver circuit, coupled to the e-paper display panel, and configured to output a driving signal to the gate selection lines, wherein the source lines corresponding to the gate selection line simultaneously receive respective data signals when the gate selection line is turned on, wherein the driving signal comprises a first period and a second period, the gate selection line is turned on during the first period, the gate selection line is not turned on during the second period, and a time length of the first period is greater than a time length of the second period, wherein the time length of the first period is T1, T1 conforms to $(1/f/GL)<T1<(1/f/GL)\times 2$, f is a frame rate of the e-paper display panel, and GL is a number of the pixel circuits arranged in the first direction.

2. The e-paper display apparatus according to claim 1, wherein the time length T1 of the first period conforms to $(1/f/GL)\times 1.5<T1<(1/f/GL)\times 2$.

3. The e-paper display apparatus according to claim 1, wherein the e-paper display panel further comprises a plurality of gate lines, the pixel circuits are electrically connected to the respective gate line and the respective source line, and the gate selection lines are electrically connected to the corresponding gate line.

4. The e-paper display apparatus according to claim 1, wherein each of the pixel circuits comprises a transistor element, and the transistor element is an oxide thin-film transistor.

5. The e-paper display apparatus according to claim 1, wherein a number of the gate selection lines is less than a number of the source lines.

6. The e-paper display apparatus according to claim 1, wherein each of the gate selection lines is disposed between corresponding two adjacent source lines among the source lines.

7. A driving method of an e-paper display panel, comprising:

outputting a driving signal to a plurality of gate selection lines of the e-paper display panel, wherein the gate selection lines and source lines are disposed along a first direction; and simultaneously outputting respective data signals to the source lines corresponding to the gate selection line when the gate selection line is turned on, wherein the driving signal comprises a first period and a second period, and the step for outputting the driving signal to the gate selection lines of the e-paper display panel comprises:

turning on the gate selection line during the first period; and not turning on the gate selection line during the second period, wherein a time length of the first period is greater than a time length of the second period, wherein the time length of the first period is T1, T1 conforms to $(1/f/GL)<T1<(1/f/GL)\times 2$, f is a frame rate of the e-paper display panel, and GL is a number of pixel circuits arranged in the first direction.

* * * * *